United States Patent [19]
Flint

[11] 3,735,136
[45] May 22, 1973

[54] DUAL COLOR RADIOMETER METHOD SELECTIVELY DISCRIMINATING AGAINST A RADIANT ENERGY EMISSIVITY CHARACTERISTIC OF A PRESELECTED ATMOSPHERIC STATE

[75] Inventor: Edward F. Flint, Fullerton, Calif.

[73] Assignee: North American Rockwell Corporation, El Segundo, Calif.

[22] Filed: June 22, 1972

[21] Appl. No.: 265,840

[52] U.S. Cl. .......................... 250/83.3 H, 73/355 R
[51] Int. Cl. ................................................ G01j 3/02
[58] Field of Search ............... 250/83.3 H, 83.3 HP; 73/355 R, 355 EM

[56] References Cited
UNITED STATES PATENTS

| | | | |
|---|---|---|---|
| 3,498,132 | 3/1970 | Smith et al. | 250/83.3 H X |
| 3,696,670 | 10/1972 | Collis | 250/83.3 H X |
| 3,699,339 | 10/1972 | Taczak, Jr. | 250/83.3 H |

Primary Examiner—Archie R. Borchelt
Attorney—L. Lee Humphries, H. Frederick Hamann and Rolf M. Pitts

[57] ABSTRACT

A dual color radiometer method for detection and discrimination of radiant energy emissivity characteristics of preselected atmospheric states. The dual output signals from the radiometer and corresponding to a respective first and second atmospheric spectral sample in a preselected spectral region, are differentially combined, one of the spectral sample signals being compensatorily gain changed such that the component signal intensity in both such output signals for a preselected atmospheric state are equal. Thus, the differentially combined signals provide a resultant signal indicative of an atmospheric state other than such preselected atmospheric state.

11 Claims, 3 Drawing Figures

DUAL COLOR RADIOMETER METHOD SELECTIVELY DISCRIMINATING AGAINST A RADIANT ENERGY EMISSIVITY CHARACTERISTIC OF A PRESELECTED ATMOSPHERIC STATE

BACKGROUND OF THE INVENTION

The detection of atmospheric anomalies by means of infrared sensors has been sought to be employed as a flight safety measure and for other applications as well. In the field of aircraft navigation, for example, certain atmospheric anomalies referred to as atmospheric turbulence pose flight safety problems, or at least problems of passenger comfort for aircraft unable to avoid traversing such anomalies.

One means of seeking to detect and distinguish such anomalies by infrared detection has been to select a spectral region or "window" in which such turbulence is manifested by a hopefully characteristic emissivity, and then to directionally sample several fields of view under surveillance and within such spectral region. The infrared sensor output is thresholded to detect a probable area, such area being further tested by periodically further sampling and thresholding thereof, subsequent thresholded samples being compared with prior thresholded samples, the subsequent intensity increase of the samples from a given sampled field of view presumed indicative of an atmospheric anomaly of interest. The thresholded detection of the $CO_2$ absorption line or narrow band in the region of 14–16 microns has been taken as sufficiently indicative of an atmospheric thermal discontinuity associated with air turbulence and detectable at a distance adequate to allow comfortable, or at least safe, evasive aircraft maneuvering. The shape, intensity, and peak frequency or wavelength of the spectral response of the $CO_2$ emissivity is known to vary with atmospheric path length or distance, as indicated in U. S. Pat No. 3,091,693 to A.C. Rudomanski for Selective Radiation Detector and Free-air Thermometer.

Such approach, in practice, produces many "false alarm" signals, erroneously indicating turbulence where none exists or, worse, failing to indicate an intense atmospheric anomaly of interest. Such ambiguities in the signalling provided by such prior art single-color radiometer systems arise from the fact that the spectral response within the spectral region of interest may be due variously to factors other, as well as the factor of interest. For example, the variable presence or absence of ice, having an emissivity characteristic within the spectral region of interest, may disguise or obscure the emissivity change occurring across a field of view under surveillance and due to the $CO_2$ emissivity associated with air turbulence, or else prevent detection at a preselected safe range or distance with sufficient certainty. Thus, unnecessary aircraft maneuvers to avoid "false" turbulence and violent last minute maneuvers to avoid late-detected turbulence may occur, which are equally undesirable as the turbulence sought to be avoided.

Dual color or color-scanning radiometer systems have been sought to be employed for clear air turbulence detection, to detect a hot spot or spectral peak within the spectral window of interest, corresponding to the $CO_2$ (spectral) line or band associated with a clear air turbulent condition, as is more fully described in U. S. Pat. No. 3,402,295 to Astheimer for Process Measuring the Distance from Thermal Discontinuities in the Atmosphere, the frequency or wavelength associated with the peak spectral response being indicative of the range or distance of such turbulence. U. S. Pat. No. 3,475,963 to Astheimer for Clear Air Turbulence Radiometer further teaches the necessity of gyro stabilization of the line of sight (of a dual color radiometer) to reduce data anomalies, in effecting a spectral profile corresponding to a temperature profile along the line of sight and indicative of a clear air turbulence condition of interest.

Such dual color spectral scanning radiometer systems of Astheimer are subject to the performance limitation of providing false signals under conditions of other than clear air. Thus, an azimuthally scanning system incidentally having other than a perfect clear air condition along at least one line of sight, would not provide consistently useful data from all lines of sight within such azimuthal scan, due to the varying emissivity associated with such variation from an ideal clear air condition.

U. S. Pat. No. 3,539,807 to S. H. Bickel for Temperature-Emissivity Separation and Temperature Independent Radiometric Analyzer, for example, teaches a dual color radiometer method for analyzing the composition of a target by logarithmetic processing or signal compression of the two output signals from a dual color radiometer system, and describes at lines 20–24 of Column 4 the differential combination of such signals to obtain an indication of target composition and at lines 24–29 of Column 4 describes additively combining the logarithmically compressed dual color radiometer signals to obtain an indication of target temperature. The two signals are then compared with "standard characteristic curves of various known materials" to identify the target composition and temperature. Curves for representative materials, such as paints observed within the 8–14 micron region, are illustrated in Bickel's FIGS. 5A–5D. Bickel does not, however, teach or suggest a dual radiometer technique for reliably distinguishing an atmospheric anomaly of interest from amid an atmosphere which may or may not include an ice condition.

BRIEF DESCRIPTION OF THE INVENTION

By means of the concept of the subject invention, a method is provided for reliably discriminating against a preselected first atmospheric state for determining the existence or intensity of a preselected second state.

In a preferred embodiment of the inventive concept, a dual color radiometer system is employed to provide a first and second output signal indicative of a first and second atmospheric spectral sample in the spectral region 13.0–15.0 microns and mutually separated spectrally by at least 0.2 microns, each output signal being a composite signal formed of two component signals indicative of respective first and second atmospheric states. Such first and second states may correspond to a $CO_2$ emissivity and an atmospheric ice emissivity. The gain of one of the two output signals is compensatorily gain-changed such that the component signal intensity thereof due to a sensed ice emissivity, for example, is equal to the corresponding component signal intensity of the second radiometer output signal. Then, by differentially combining the compensatorily gain-changed one and the unweighted other output signal, a combined output signal is provided, the intensity of which is substantially non-responsive to the variable presence or absence of atmospheric ice content, as to the substantially uniformly responsive to the $CO_2$ line corresponding to the atmospheric thermal discontinuity associated with atmospheric turbulence. Hence, the range predictions or calibrations of such indications as functions of wavelength and signal threshold will be more reliable.

Accordingly, it is an object of the invention to provide an improved dual color radiometer method for reliably detecting an atmospheric anomaly of interest.

It is another object to provide a method for determination of atmospheric turbulence which is substantially independent of the presence or amount of atmospheric ice content.

A further object is to provide an improved dual radiometry method for detection and discrimination of preselected atmospheric anomalies.

These and further objects of the invention will become apparent from the following description, taken together with the accompanying drawings in which:

BRIEF DESCRIPTION OF THE DRAWINGS

In the figures, like reference characters refer to like elements.

DESCRIPTION OF THE PREFERRED EMBODIMENT

Figure 1:
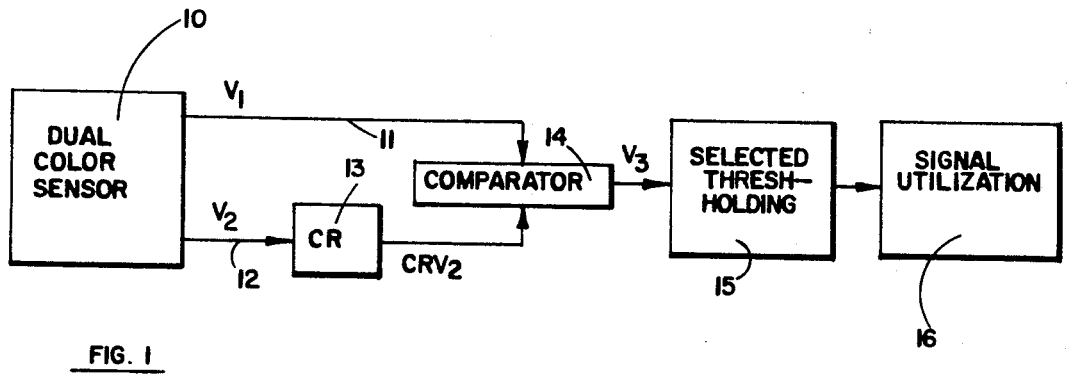
FIG. 1 is a simplified block diagram of a dual radiometer system embodying the concept of the invention.

Referring now to FIG. 1, there is illustrated in block diagram form a dual color radiometer system embodying the concept of the invention. There is provided a dual radiometer sensor 10 adapted for airborne use for providing a respective first and second output signal ($V_1$ and $V_2$) at a respective first and second output 11 and 12 of sensor 10 and indicative of a first and second atmospheric spectral sample of a selected field of view. For purposes of exposition, such spectral samples are selected as 13.8 and 14.1 microns. Sensor 10 is calibrated and biased against a black body reference, so as to minimize the effects of own-ship temperature or ambient thermal radiation, as is well understood in the art. The comparative calibration of the set or pair of outputs of sensor 10 is further simplified where a single infrared sensitive element is arranged to be time-shared between two spectral samples by means of a light chopper (employing two filters) in synchronism, with commutation of the sensor output between the two outputs 11 and 12, as is described for example in the above-noted U.S. Pat. No. 3,475,963 to Astheimer. In the intended application for atmospheric sensing within the bandwidth of interest, the dual color radiometer output signals $V_1$ and $V_2$ (as samples for sampled wavelengths $\lambda_1$ and $\lambda_2$, respectively) may each be considered as being comprised of two components, a clear air $CO_2$ emissivity component, $e_{CO_2}$, and an atmospheric ice contribution $\Delta e_{ice}$:

$$V_1 = e_{1CO_2} + \Delta e_{1ice}$$
$$V_2 = e_{2CO_2} + \Delta e_{2ice}$$

(1)

where, generally, $$e_{1ice} \neq e_{2ice}$$

In order to provide a composite signal more nearly indicative of the detected presence of a $CO_2$ condition of interest, or condition signalling a thermal discontinuity associated with atmospheric turbulence, the signal-level of one of the output signals $V_1$ and $V_2$ is compensatorily changed whereby the component signal intensities thereof due to the detected atmospheric ice condition are made substantially equal. For example, the gain of $V_2$ may be multiplied by the gain factor CR (hereinafter referred to as the cloud ratio) whereby the component signal intensity of both signals, $CRV_2$ and $V_1$, due to the detected ice emissivity are substantially equal. Such signal weighting or gain-changing is effected in FIG. 1 by an adjustable gain element 13, which may be an adjustable gain amplifier or potentiometer or other devices known in the art for signal-scaling or gain-changing.

Such compensatorily gain-changed one and unweighted other of the two signals ($CRV_2$ and $V_1$) are then differentially combined by differential signalling means 14 known in the art, whereby the two ice emissivity component signals are substantially cancelled and the resultant differential signal is indicative of the intensity of the $CO_2$ line, which resultant signal may then be thresholded to determine the occurrence of an atmospheric thermal discontinuity of interest.

For the exemplary spectral sampling selected of 13.8 and 14.1 microns, a gain-weighting of $CR = 2.0$ of the 14.1 micron sample has been found useful in flight tests at 30,000 feet altitude. However, the general basis for the determination of such gain-weighting or cloud-ratio may be better appreciated from a consideration of FIGS. 2 and 3.

Referring to the above-noted U.S. Pat. No. 3,402,295 to R. W. Astheimer, there is illustrated in FIG. 1 thereof a family of representative curves of radiometer spectral response versus wavelength in the 13–15 micron wavelength region to the $CO_2$ band associated with a clear-air atmospheric discontinuity at a representative altitude, such curves representing a family of different range-distances from such discontinuity. It is to be appreciated from such responses that the peak response for a preselected detection range is associated with a characteristic wavelength; that the greater the detection range desired or selected, the shorter the wavelength at which the peak response occurs and also the lesser the intensity of such peak response. Accordingly, the filter or sampling wavelengths selected within the $CO_2$ band for a given system design will be a design compromise between certainty of detection (desired signal intensity over noise) and maximum detection range-distance in which to effect evasive maneuvers.

Figure 2:
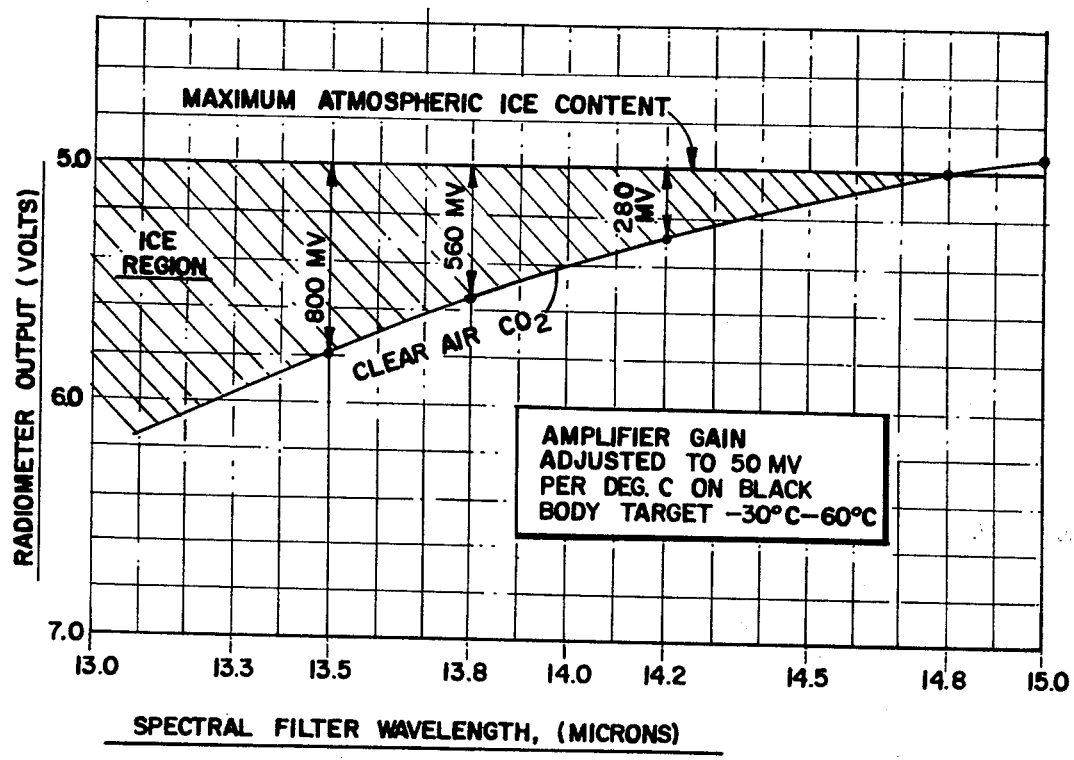
FIG. 2 is a family of curves of temperature and emissivity for $CO_2$, ice and a representative black body reference as functions of spectral wavelength within the spectral bandwidth, 13–15 microns.

Referring to my FIG. 2 there is illustrated a representative family of curves of 100 percent emissivity temperature for maximum atmospheric (dense cloud) ice and $CO_2$, clear air $CO_2$, and an exemplary black body reference versus wavelength for an exemplary atmospheric altitude of 30,000 feet. It is to be seen from curve 21 that the spectral emissivity of maximum ice content atmosphere is substantially flat or invariant with wavelength within the bandwidth of interest (13.2–15.0 microns), while the 100 percent emissivity clear-air $CO_2$ response curve 22 demonstrates a generally positive slope, being somewhat linear in the region 13.8–14.1 microns. It is also to be seen that the temperature $\Delta T_1$ between the maximum ice content $CO_2$ emissivity line 21 and the clear air $CO_2$ emissivity line 22 at 13.8 microns is about twice that $\Delta T_2$ occurring at 14.1 microns:

$$\Delta T = e_{icy\ air} - e_{clear\ air} \qquad (2)$$

$$\Delta T_1/\Delta T_2 = 223 - 203/223 - 212 = 20/10 = 2.0 \qquad (3)$$

Other values of CR for other pairs of sampled wavelengths are as follows:

| CR | $\lambda_1$ | $\lambda_2$ |
|---|---|---|
| 1.7 | 13.7 | 14.0 |
| 2.1 | 13.9 | 14.2 |
| 3.0 | 13.5 | 14.2 |
| 1.5 | 14.0 | 14.2 |

The temperature difference $\Delta T$ between the maximum ice content $CO_2$ emissivity line and the clear air $CO_2$ emissivity line is a characteristic of the ice emissivity itself, and is seen to decrease as sampled wavelength increases, within the region 13.5–14.3 microns, for example. Such difference will be less for ice conditions less than maximum, approaching a zero difference for the dry or clear air $CO_2$ condition. However, it has been demonstrated that the ratio CR, of the sensed temperature difference $\Delta T_2$ due to such ice content at one sampled wavelength (say 14.1 microns) relative to the corresponding temperature difference $\Delta T_1$ at another sampled wavelength (say 13.8 microns), will be the same regardless of the variation in ice content (ice content less than maximum, say).

For example, it has been shown above that the ratio ($\Delta T_1/\Delta T_2 = CR$) for $\lambda_1 = 13.8$ and $\lambda_2 = 14.1$ microns for a maximum ice content contribution is 2.0. Where the ice content is less than maximum, the locus of the resultant emissivity line would lie somewhere between curve 21 and curve 22. In other words, the lesser ice-content atmospheric $CO_2$ emissivity response 21' within the region 13.8–14.1 microns would be higher than curve 22 but below curve 21; however, the lesser temperature differences ($\lambda T_1'$ and $\lambda T_2'$) between such ice-content response and the clear air 100 percent emissivity $CO_2$ response for such two sampled wavelengths will still be in the same ratio (CR) as those for the maximum ice content situation:

$$\Delta T_1'/\Delta T_2' = \Delta T_1/\Delta T_2 = CR \qquad (4)$$

Also, should the $CO_2$ content (or degree of turbulence) be less than that indicated by clear air curve 22, whereby a lower clear air curve would result, the corresponding ice-content $CO_2$ curves would be similarly lower. However, the above-noted ratio (CR) between the ice-content contributions for the same sampled wavelengths will again be the same. Accordingly, a highly effective method is suggested for cancelling the emissivity effect of atmospheric ice content in the measurement of $CO_2$ emissivity.

Considering the dual outputs $V_1$ and $V_2$ for the dual color radiometer, each comprising two components, a clear air $CO_2$ emissivity component $e_{CO_2}$ and an ice content contribution $\Delta e_{ice}$, as represented by the pair of Equations (1) and (2), above, the signal levels of either or both of signals $V_1$ and $V_2$ are adjusted until the ice content components are equal. Ice component cancellation may then be effected by differential combination of the adjusted signals. For the example of radiometer samples $\lambda_1 = 13.8$ and $\lambda_2 = 14.1$ microns, the ice component signal $\Delta e_{2_{ice}}$ for the 14.1 micron signal will be one half that for the 13.8 micron signal $e_{1_{ice}}$. Then:

$$e_{1_{ice}}/e_{2_{ice}} = \Delta T_1/\Delta T_2 = 2 \qquad (5)$$

In other words, assuming a linear response radiometer, the ice contribution signal $\Delta e_{ice}$ is proportional to the ice contribution temperature difference $\Delta T$. Therefore, the ratios of such component signals will be the same as the incremental temperature ratios $$CR = \Delta T_1/\Delta T_2 = \Delta e_{1_{ice}}/\Delta e_{2_{ice}}.$$

Accordingly, by compensatorily gain-scaling one of the dual color radiometer output signals by the inversion of the ice effect sensed at such wavelength or color to the ice effect sensed at the other wavelength or color, the two ice effect signal components may be made equal to each other:

$$\left. \begin{array}{l} V_1 = \Delta e_{1_{ice}} + \Delta e_{1_{clear\ air}} \\ \\ CR[V_2 = \Delta e_{2_{ice}} + \Delta e_{2_{clear\ air}}] \end{array} \right\} \qquad (6)$$

where:
$V_1$ = radiometer output for icy air at $\lambda_1$
$V_2$ = radiometer output for icy air at $\lambda_2$
$\Delta e_{2_{ice}}$ = ice contribution to icy air for $\lambda_1$
$\Delta e_{1_{ice}}$ = ice contribution to icy air for $\lambda_2$ $$CR = \Delta T_1/\Delta T_2 = \Delta e_{1_{ice}}/\Delta e_{2_{ice}}$$

For the above-noted exemplary sample conditions of $\lambda_1 = 13.8$ microns and $\lambda_2 = 14.1$ microns at 30,000 feet, it has been shown that $CR = 2.0$. Therefore:

$$\Delta e_{1_{ice}} = \frac{\Delta e_{1_{ice}}}{\Delta e_{2_{ice}}} \Delta e_{2_{ice}} = CR\Delta e_{2_{ice}} = 2 \times \Delta e_{2_{ice}} \qquad (7)$$

Accordingly, Equation set (6) may be differentially combined to eliminate such ice effect or ice contribution:

$$CRV_2 - V_1 = CR\Delta e_{2_{ice}} - \Delta e_{1_{ice}} + CRe_{2_{clear\ air}} - e_{1_{clear\ air}} \qquad (8)$$

From Equation (7), $$CR\Delta e_{2_{ice}} - \Delta e_{1_{ice}} = 0 \qquad (9)$$

Therefore, Equation (8) may be simplified:

$$CRV_2 - V_1 = CRe_{2_{clear\ air}} - e_{1_{clear\ air}} \qquad (10)$$

now:

$$CRV_2 - V_1 = V_3 \quad (11)$$

Accordingly:

$$V_3 = CRe_{2_{\text{clear air}}} - e_{1_{\text{clear air}}} \quad (12)$$

In other words, an output signal $V_3$ may be obtained which is indicative of the intensity of a sensed $CO_2$ line (corresponding to an atmospheric turbulence of interest) and which is substantially unaffected by the presence or amount of atmospheric ice content of such turbulent atmosphere.

Figure 3:
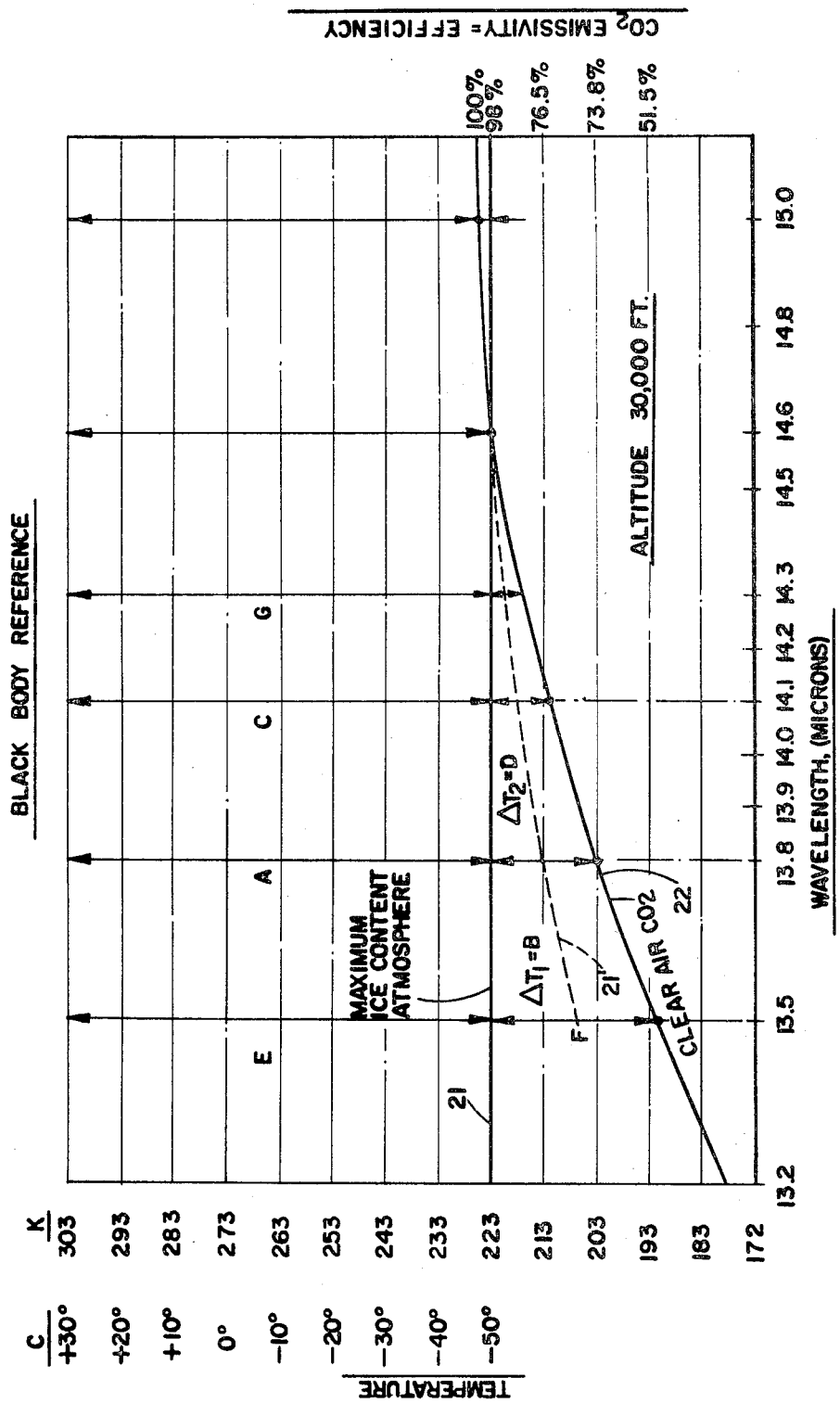
FIG. 3 is a set of normalized representative responses of an exemplary dual beam radiometer, for the spectral pair of wavelengths 13.8 and 14.1 microns, under representative atmospheric sampling conditions between 28,000 to 41,000 feet altitude.

It is to be noted from FIG. 3 that in an exemplary embodiment of the radiometer 10 employed, the excitation and biasing of the radiometer response is such that a higher response voltage results from lower sensed temperatures in the temperature region of interest. However, other signal arrangements may be employed without deviating from the principles of the invention; the principle, of compensatorily gain-scaling one of the radiometer signals relative to the other to effect cancellation of the difference signal or signal component due to or contributed by the ice content (if any), being unaffected by such alternate arrangements.

Because the resultant signal $V_3$ at the output of differential signalling means 14 in FIG. 1 is thus indicative of only the intensity of the atmospheric $CO_2$ emissivity along a sampled field of view, such signal may be threshold-tested to determine the existence and proximity of a turbulent state of preselected intensity. Also, thresholded successive samples in point of time (say, every 15–45 seconds) may be compared or averaged or otherwise processed to determine or confirm the approach of such turbulent area, and for preselectively exciting various warning signal indicators and the like. For a turbulent state intensity predicted to cause an aircraft flight path disturbance in the region of 0.2 "$g$," a sufficient precaution may be to require passenger seat belts to be fastened. For a warning indicative of a predicted disturbance in the region of 0.4 to 0.6 "$g$," the aircraft may require to "throttle back" to reduce the airspeed speed and associated "speed bump" effect with which the aircraft encounters the turbulence. Additionally, the hold-altitude mode or pitch loop controller of the autopilot may be disconnected to avoid automatic flight control transient responses to such disturbances (in the absence of effective gust alleviation devices). Warning signal devices responsive to flight path conditions may be employed to excite "Fasten Seat Belt" warning devices or to automatically effect a "throttle back" mode or "autopilot disconnect" mode. Where the dual color radiometer 10 employs a light chopper and synchronous commutation to provide separate outputs $V_1$ and $V_2$ corresponding to the spectral samples, sample-and-hold signalling means may be required in the cooperation of differential signalling means 14 of FIG. 1 for effecting the desired differential output signal, $V_3 = CRV_2 - V_1$. Where digital signalling is employed, suitable shift register buffer storage may be employed as is well understood in the digital art. Where analog signalling is employed, fast-response analog sample-and-hold circuit devices may be employed, as is well understood in the analog signalling art. Alternatively, gated signal averaging devices such as an R-C lag network (in the case of analog signals) or a digital low-pass filter (in the case of digital signals) may be used in lieu of such buffering to obtain a gated running average of $CRV_2$ signals and $-V_1$ signals and corresponding to the signal $V_3$.

A selected number of successively sampled thresholded $V_3$ signals may be employed to establish a warning condition or as a safeguard against "false alarms." In other words, the duration of a thresholded state, as well as the height of the threshold, may be employed in further signal processing to identify a turbulent state of at least a preselected intensity. Many forms of signal processing or signal testing or signal comparisons may be made of the $V_3$ signals from a given sensor line of sight, while the comparative testing of intensity conditions along different lines of sight or directionally scanned fields of view may be employed to locate the direction and intensity of a turbulent state of interest, without departing from the principles of the invention. However, the general utility of such turbulence intensity-indicating thresholded signals will rely upon the concept of my method for substantially eliminating the effect of atmospheric ice content in the outputs of a dual color radiometer by compensatorily gain-scaling of at least one of two spectral samples in the 13.5–14.5 micron region, such that the ice content contribution or signal components in the dual outputs are substantially equal, and then differentially combining such signals to obtain cancellation of the ice content effect.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a dual color radiometer system for providing a respective first and second output signal indicative of a respective first and second spectral sample in the spectral region 13.0–15.0 microns and mutually separated spectrally by at least 0.2 microns, means for determining the intensity of a preselected one of two preselected states in a medium demonstrating a characteristic radiant energy spectral distribution representing the combined spectral distributions associated with said two states and comprising means for differentially combining said two output signals, and means for compensatorily gain-changing one of said two output signals prior to the differential combinations thereof, whereby the component signal intensity of both said output signals due to said second state of said medium are substantially equal and said differentially combined signals are indicative of the intensity of said first state of said medium.

2. A system for detecting the relative intensity of a preselected one of two preselected states in a medium demonstrating a characteristic radiant energy spectral distribution representing the combination of the component spectral distributions associated with each such two states and comprising means responsive to a respective first and preselected spectral sample of said medium for providing a respective first and second output signal;

means for compensatorily gain-changing one of said signals relative to the other whereby the component signal intensity in said signals due to said second state are substantially equal; and means for comparing said gain-changed and non-gain changed signals to determine the intensity of said first state.

3. The device of claim 2 in which said system is adapted for detecting that presence of $CO_2$ associated with atmospheric turbulence in an atmosphere demonstrating a characteristic spectral distribution representing the combination of the component spectral distributions associated with such $CO_2$ and atmospheric ice content, said first recited means of claim 2 comprising dual color radiometer means for providing first and second electrical output signals indicative of a respective first and second spectral sample in the 13.5 and 14.5 micron range and mutually separated by at least 0.2 microns; and said second recited means of claim 2 comprising means for compensatorily gain-changing one of said two signals relative to the other whereby the component signal intensity in said signals due to said atmospheric ice content is substantially equal, the first state intensity determined by said third recited means of claim 2 being indicative of that $CO_2$ component signal intensity corresponding to the severity of an air turbulence state.

4. Apparatus for detecting the intensity of a preselected one of two preselected states in a medium demonstrating a characteristic radiant energy spectral distribution representing the combined component spectral distributions associated with said two states and comprising means responsive to a respective first and second spectral sample of said medium for providing a respective first and second sensor signal;

means for compensatorily gain-changing one of said sensor signals relative to the other whereby the component signal intensity of said signals due to said second state of said medium are substantially equal; and means for comparing said gain-changed and the non-gain changed one of said signals to determine the intensity of said first state.

5. Apparatus for detecting the intensity of a preselected one of two preselected states in a medium demonstrating a characteristic radiant energy spectral distribution representing the combined component spectral distributions associated with said two states and comprising means responsive to a respective first and second spectral sample of said medium for providing a respective first and second sensor signal;

means for compensatorily gain-changing one of said sensor signals relative to the other whereby the component signal intensity of said signals due to said second state of said medium are substantially equal; and means for differentially combining said gain-changed and the non-gain changed one of said signals to cancel that signal component due to said second state, whereby an output signal is generated which is indicative of the intensity of said first state.

6. Apparatus for detecting the intensity of a preselected one of two preselected states in an atmosphere demonstrating a characteristic radiant energy spectral distribution representing the combined component spectral distributions associated with said two states in a common spectral region and comprising means responsive to a respective first and second spectral sample of said atmosphere in said spectral region for providing a respective first and second sensor signal;

means for compensatorily gain-changing one of said sensor signals relative to the other whereby the component signal intensity of said signals due to said second state of said medium are substantially equal; and means for comparing said gain-changed and the non-gain changed one of said signals to determine the intensity of said first state.

7. Apparatus for detecting the magnitude of the $CO_2$ state in an atmospheric sector having a $CO_2$ content and an ice content, said sector demonstrating a characteristic radiant energy spectral distribution representing the combined component spectral distributions associated with said two contents in a common spectral region and comprising means responsive to a respective first and second spectral sample of said atmosphere for providing a respective first and second sensor signal;

means for compensatorily gain-changing one of said sensor signals relative to the other whereby the component signal intensity of said signals due to said second content of said medium are substantially equal; and means for differentially combining said gain-changed and the non-gain changed one of said signals to cancel that signal component due to said second state, whereby an output signal is generated which is indicative of the intensity of said $CO_2$ state.

8. Apparatus for detecting air turbulence intensity occurring in an atmosphere with or without ice content and comprising means responsive to a respective first and second spectral sample of said atmosphere for providing a respective first and second sensor signal indicative of mutually exclusive spectral lines in the spectral region 13.0–15.0 microns;

means for compensatorily gain-changing one of said sensor signals relative to the other whereby the component signal intensity of said signals due to an ice content state of said atmosphere are substantially equal; and means for comparing said gain-changed and the non-gain changed one of said signals to determine the intensity of said $CO_2$ state.

9. The device of claim 8 in which said means for comparing comprises means for differentially combining said gain-changed and the non-gain changed one of said signals to cancel that signal component due to said second state, whereby an output signal is generated which is indicative of the intensity of said $CO_2$ state.

10. The device of claim 9 in which said output signal is preselectively thresholded to determine the presence of an intensity associated with an air turbulence state.

11. The device of claim 8 in which said first recited means provides a respective first and second sensor signal indicative of a respective first and second spectral sample corresponding to 13.8 and 14.2 microns wavelength, respectively, and said second recited means doubles the gain of said first sensor signal relative to that of said second sensor signal.

* * * * *